(12) United States Patent
Shibata et al.

(10) Patent No.: US 6,541,092 B2
(45) Date of Patent: Apr. 1, 2003

(54) OPTICAL INFORMATION STORAGE MEDIUM

(75) Inventors: Michihiro Shibata, Kanagawa (JP); Shinichi Morishima, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/931,062

(22) Filed: Aug. 17, 2001

(65) Prior Publication Data

US 2002/0041948 A1 Apr. 11, 2002

(30) Foreign Application Priority Data

Aug. 18, 2000 (JP) ........................................ 2000-248387

(51) Int. Cl.[7] ................................................ B32B 3/02
(52) U.S. Cl. .................... 428/64.1; 428/64.4; 428/64.8; 430/270.14
(58) Field of Search ............................... 428/64.1, 64.4, 428/64.8, 913; 430/270.14, 495.1, 945; 369/283, 288

(56) References Cited

U.S. PATENT DOCUMENTS 5,244,774 A * 9/1993 Usami ........................ 430/271
6,045,971 A * 4/2000 Yashiro ................. 430/270.16

FOREIGN PATENT DOCUMENTS

EP 0 962 923 A1 12/1999
JP 3-224793 10/1991

OTHER PUBLICATIONS

Japanese Abstract No. 03051183, dated Mar. 5, 1991.

* cited by examiner

*Primary Examiner*—Elizabeth Mulvaney
(74) *Attorney, Agent, or Firm*—Sughrue Mion, PLLC

(57) ABSTRACT

An optical information storage medium having small jitter value and high recording sensitivity. The optical information storage medium has a transparent pregrooved substrate having thereon a dye recording layer, in which information can be recorded by irradiation with a laser, and a light-reflective layer on the dye recording layer, which is made of a metal. The dye recording layer contains a dye A, which has a maximum absorption wavelength in a 400 to 700 nm range, and a dye B, which has a maximum absorption wavelength 3 to 50 nm longer than that of the dye A. A sensitivity ratio Q between the dye A and the dye B, which is represented by the following equation, is from 0.20 to 0.55:

$$Q=(PA-PB)/PA$$

where PA represents optimum recording power for the dye A and PB represents optimum recording power for the dye B.

20 Claims, No Drawings

OPTICAL INFORMATION STORAGE MEDIUM

BACKGROUND OF THE INVENTION

1. Field of the Invention

The present invention relates to an optical information storage medium and more specifically relates to an optical information storage medium having a small jitter value and a high sensitivity.

2. Description of the Related Art

Heretofore, an additionally recordable, optical information storage medium (optical disk) that enables recording one time only known as a CD-R has been widely known. A typical construction of a CD-R type optical information storage medium comprises a transparent discoid substrate having thereon a dye recording layer made of an organic dye, a light-reflective layer made of a metal such as gold, and a protective layer made of a resin, in the order listed. Recording of information on this optical disk is performed by the irradiation of the optical disk with a laser in a near-infrared region (usually a laser having a wavelength of about 780 nm). The irradiated portion of the dye recording layer absorbs light and the temperature rises locally. The rise in the temperature causes a change of a physical or chemical property in the irradiated portion (such as pit formation) and thus brings about a change in optical properties at the irradiated portion. As a result, information is stored. When the information is reproduced, generally the optical disk is irradiated with a laser having the same wavelength as that of the laser for recording so as to detect a reflectivity difference between the portion whose optical properties have changed (recorded portion) and a portion whose optical properties have not changed (unrecorded portion) in the dye recording layer.

Recently, as a medium that enables information storage at a higher density than CD-R, DVD-R, which is an additionally recordable optical disk, has been proposed (for example, in "Nikkei New Media", extra issue entitled "DVD", 1995) and put to practical use, thus establishing a reputation as a large-capacity information storage medium. Generally, a DVD-R is made of two disks, each of which comprises a transparent discoid substrate having thereon a dye recording layer containing an organic dye, a light-reflective layer, and a protective layer, laminated in the order listed, and these disks are adhered to each other such that the dye recording layers face inward. Alternatively, the DVD-R is made of a disk having the above-described construction and a discoid protective substrate in the same shape, wherein the disk and the discoid protective substrate are adhered to each other such that the dye recording layer faces inward. On the transparent discoid substrate, guide grooves (pregrooves) designed for tracking of a laser at a time of recording by laser irradiation are formed with a narrow track pitch (0.74 to 0.8 μm) which is less than half that for a CD-R. In the DVD-R, recording and reproduction of information are performed by irradiating the optical disk with a laser in the visible region (usually a laser in a wavelength region ranging from 630 to 680 nm). Accordingly, since the recording is performed by light having a wavelength shorter than that for CD-R, information storage at a higher density is possible in the DVD-R.

In DVD-R, the recording light has a shorter wavelength and therefore a beam spot is smaller than for CD-R. Because of this, DVD-R had a problem that the pit size to be formed in the dye recording layer was smaller and jitter became larger. Jitter means scattering of pit signals and blank signals, which are obtained from pits and blanks between the pits which are respectively formed on the substrate according to information signals when information is recorded. In other words, jitter means scattering of pit shapes. Generally, as recording sensitivity of the dye contained in the dye recording layer is raised, the jitter value tends to become larger. Therefore, it was difficult to obtain an optical information storage medium having a small jitter value and a high recording sensitivity.

SUMMARY OF THE INVENTION

In view of the problems associated with the prior art, the present invention was made. It is accordingly an object of the present invention to provide an optical information storage medium having a small jitter value and a high recording sensitivity.

The present inventors have established the present invention based on the discovery that jitter value is remarkably improved and recording sensitivity of a dye recording layer is maintained at a high value if two kinds of dyes, each of which fulfills predetermined requirements, are used in a mixture.

According to a first aspect, the optical information storage medium of the present invention includes: a transparent pregrooved substrate; a dye recording layer provided on the substrate, at which information can be recorded by irradiation with a laser; and a light-reflective layer provided on the dye recording layer, which is made of a metal, wherein the dye recording layer comprises a dye A, which has a maximum absorption wavelength in a range from 400 to 700 nm, and a dye B, which has a maximum absorption wavelength 3 to 50 nm longer than the maximum absorption wavelength of the dye A, and a sensitivity ratio Q of the dye A to the dye B, which is represented by the following equation, is from 0.20 to 0.55:

$$Q=(PA-PB)/PA$$

where PA represents an optimum recording power for the dye A and PB represents an optimum recording power for the dye B.

In general, the use of a dye having a high recording sensitivity in the dye recording layer tends to raise the jitter value. The incorporation of the dye A and the dye B, whose recording sensitivity is higher than that of the dye A, in the dye recording layer improves the recording sensitivity relative to the case where the dye A is used singly. If the dye A and the dye B are used in a combination such that the difference between the recording sensitivities of the two dyes is controlled to within a predetermined range, the dye A has the maximum absorption wavelength in the 400 to 700 nm range and the dye B has the maximum absorption wavelength 3 to 50 nm longer than that of the dye A, the jitter value is remarkably improved in comparison with the case where one of the two dyes is used singly.

In the optical information storage medium, preferably, the dye A and the dye B to be used in the dye recording layer are each an oxonol-based dye and particularly preferably an oxonol-based dye represented by the following general formula (1):

General Formula (1)

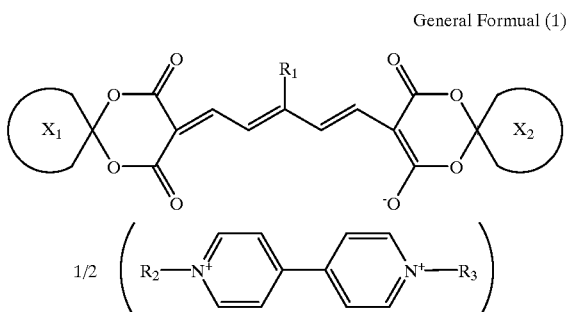

In the formula, $X_1$ and $X_2$ are each a carbocycle or a heterocycle; $R_1$ represents a hydrogen atom, an alkyl group, an aralkyl group, an alkoxy group, an aryl group, an aryloxy group, a heterocyclic group, a halogen atom, a carboxyl group, an alkoxycarbonyl group, a cyano group, an acyl group, a carbamoyl group, an amino group, a substituted amino group, a sulfo group, a hydroxyl group, a nitro group, a sulfonamide group, a ureido group, a sulfonyl group, a sulfinyl group, or a sulfamoyl group; and $R_2$ and $R_3$ each independently represents an alkyl group, an alkenyl group, an alkynyl group, an aralkyl group, an aryl group, or a heterocyclic group.

A mixing ratio by weight between the dye A and the dye B is preferably A:B=from 100:20 to 100:100. The dye recording layer preferably contains a browning inhibitor and it is preferable that the browning inhibitor has a maximum absorption wavelength at a wavelength longer than the recording wavelength.

DESCRIPTION OF THE PREFERRED EMBODIMENTS

Details of the embodiments of the optical information storage medium of the present invention are given below.

The optical information storage medium of the present invention has a dye recording layer in which information can be recorded by irradiation with a laser, and the dye recording layer contains a dye A, which has a maximum absorption wavelength in a 400 to 700 nm range, and a dye B, which has a maximum absorption wavelength 3 to 50 nm longer than the dye A. A sensitivity ratio Q, which is represented by the following equation, between the dye A and the dye B is 0.20 to 0.55:

$$Q=(PA-PB)/PA$$

where PA represents an optimum recording power for the dye A and PB represents an optimum recording power for the dye B.

The dye A is a dye having a maximum absorption wavelength in a 400 to 700 nm range and the dye B is a dye having a maximum absorption wavelength 3 to 50 nm longer, preferably 15 to 45 nm longer, and more preferably 20 to 40 nm longer, relative to the dye A. If the difference in maximum absorption wavelengths between the dye A and the dye B is less than 3 nm, the improvement of jitter will be insufficient. On the other hand, if the difference in maximum absorption wavelengths between the dye A and the dye B exceeds 50 nm, recording/reproduction characteristics such as jitter, reflectivity, and degree of modulation will become inferior.

The sensitivity ratio Q between the dye A and the dye B is 0.20 to 0.55, preferably 0.25 to 0.50, and more preferably 0.30 to 0.45. If the sensitivity ratio Q between the dye A and the dye B is outside this range, the jitter value will be larger.

As stated above, the sensitivity ratio Q is expressed using the optimum recording powers of the dye A and the dye B. The dye whose optimum recording power is smaller has a higher recording sensitivity. The term "optimum recording power" means a recording power that causes the smallest jitter when the jitter is measured for various recording powers. Since the optimum recording power varies depending on differences in dye layer thickness, reflective layer and the like, the optimum recording power of a dye is defined in the present invention as follows. On a 0.6 mm-thick polycarbonate substrate, which has grooves formed on the surface thereof, a layer of a dye is formed by spin coating such that the thickness of the dye layer on the groove is 100 nm and thereafter a 150 nm-thick silver reflective layer is formed by sputtering on the dye layer. Using this sample, the optimum recording power is measured and the value thus obtained was defined as the optimum recording power of the dye. The characteristics of the groove are as follows. Groove depth is within a range of 50 to 200 nm; half-value breadth is within a range of 20 to 500 nm; and inclination is within a range of 10 to 80°.

The mixing ratio by weight between the dye A and the dye B is preferably within a range from 100:20 to 100:100, more preferably within a range from 100:20 to 100:80, and particularly preferably within a range from 100:25 to 100:70.

The dye A and the dye B are not particularly limited insofar as the dye A and the dye B satisfy the conditions described above. Dyes that can be used include cyanine-based dyes, phthalocyanine-based dyes, imidazoquinoxaline-based dyes, pyrylium-based dyes, thiopyrylium-based dyes, azulenium-based dyes, squarylium-based dyes, complex salt-based dyes of metals such as Ni and Cr, naphthoquinone-based dyes, anthraquinone-based dyes, indophenol-based dyes, indoaniline-based dyes, triphenylmethane-based dyes, merocyanine-based dyes, oxonol-based dyes, aminium-based dyes, diimmonium-based dyes, and nitroso-based compounds.

Among these dyes, it is preferable to use an oxonol-based dye at least as the dye A, in order to enhance the jitter improvement effect. A particularly remarkable jitter improvement effect is observed when an oxonol-based dye is used as the dye A and also an oxonol-based dye is used as the dye B.

The oxonol-based dyes are preferably the dyes represented by the following general formula (1).

General Formula (1)

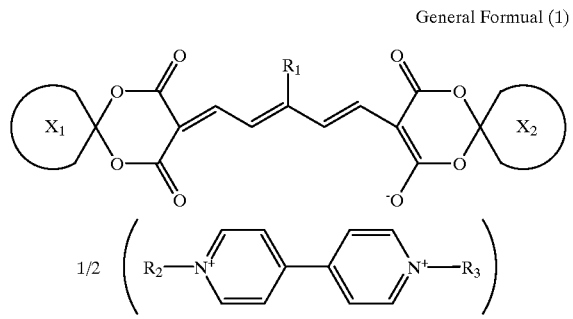

In the formula, $X_1$ and $X_2$ are each a carbocycle or a heterocycle; $R_1$ represents a hydrogen atom, an alkyl group, an aralkyl group, an alkoxy group, an aryl group, an aryloxy group, a heterocyclic group, a halogen atom, a carboxyl group, an alkoxycarbonyl group, a cyano group, an acyl group, a carbamoyl group, an amino group, a substituted amino group, a sulfo group, a hydroxyl group, a nitro group, a sulfonamide group, a ureido group, a sulfonyl group, a sulfinyl group, or a sulfamoyl group; and $R_2$ and $R_3$ each independently represents an alkyl group, an alkenyl group, an alkynyl group, an aralkyl group, an aryl group, or a heterocyclic group.

In the formula (1), $X_1$ and $X_2$ are each a carbocycle (e.g., cyclopropyl, cyclobutyl, cyclopentyl, cyclohexyl, 2-methylcyclohexyl, cycloheptyl, or cyclooctyl) or a heterocycle (e.g., piperidyl, chromanyl, or morpholyl). Preferably, $X_1$ and $X_2$ are each a carbocycle having 3 to 10 carbon atoms or a heterocycle having 2 to 10 carbon atoms. More preferably, $X_1$ and $X_2$ are each cyclohexyl or adamantyl. Preferably, $X_1$ and $X_2$ are the same.

$R_1$ is a hydrogen atom, an alkyl group having 1 to 20 carbon atoms (e.g., methyl, ethyl, propyl, carboxymethyl, or ethoxycarbonylmethyl), an aralkyl group having 7 to 20 carbon atoms (e.g., benzyl or phenethyl), an alkoxy group having 1 to 8 carbon atoms (e.g., methoxy or ethoxy), an aryl group having 6 to 20 carbon atoms (e.g., phenyl or naphthyl), an aryloxy group having 6 to 20 carbon atoms (e.g., phenoxy or naphthoxy), a heterocyclic group (e.g., pyridyl, pyrimidyl, pyridazyl, benzimidazolyl, benzothiazolyl, benzoxazolyl, 2-pyrrolidinone-1-yl, 2-piperidone-1-yl, 2,4-dioxyimidazolidine-3-yl, 2,4-dioxyoxazolidine-3-yl, succinimide, phthalimide, or maleimide), a halogen atom (e.g., fluorine, chlorine, bromine, or iodine), a carboxyl group, an alkoxycarbonyl group having 2 to 10 carbon atoms (e.g., methoxycarbonyl or ethoxycarbonyl), a cyano group, an acyl group having 2 to 10 carbon atoms (e.g., acetyl or pivaloyl), a carbamoyl group having 1 to 10 carbon atoms (e.g., carbamoyl, methylcarbamoyl, or morpholinocarbamoyl), an amino group, a substituted amino group having 1 to 20 carbon atoms (e.g., dimethylamino, diethylamino, bis(methylsulfonylethyl)amino, or N-ethyl-N'-sulfoethylamino), a sulfo group, a hydroxyl group, a nitro group, a sulfonamide group having 1 to 10 carbon atoms (e.g., methanesulfonamide), a ureido group having 1 to 10 carbon atoms (e.g., ureido or methylureido), a sulfonyl group having 1 to 10 carbon atoms (e.g., methanesulfonyl or ethanesulfonyl), a sulfinyl group having 1 to 10 carbon atoms (e.g., methanesulfinyl), or a sulfamoyl group having 0 to 10 carbon atoms (e.g., sulfamoyl or methanesulfamoyl). A carboxyl group or sulfo group may be in a state of a salt.

The aryl groups represented by $R_1$ include an aryl group having 6 to 12 carbon atoms (e.g., phenyl or naphthyl). The aryl group may further have a substituent. The aralkyl groups represented by $R_1$ include an aralkyl group having 7 to 20 carbon atoms (e.g., benzyl or phenethyl). The aralkyl group may further have a substituent. The heterocyclic groups represented by $R_1$ are 5- to 6-membered, saturated or unsaturated heterocyclic groups made up of carbon atoms, nitrogen atoms, oxygen atoms and sulfur atoms. Examples of the heterocyclic groups include a pyridyl group, a pyrimidyl group, a pyridazyl group, a piperidyl group, a triazyl group, a pyrrolyl group, an imidazolyl group, a triazolyl group, a furanyl group, a thiophenyl group, a thiazolyl group, an oxazolyl group, an isothiazolyl group, and an isooxazolyl group. Groups that are formed by benzenoid annelation to the groups listed above (e.g., a quinolyl group, a benzimidazolyl group, a benzothiazolyl group, or a benzoxazolyl group) are also included in the heterocyclic groups represented by $R_1$. These groups may have a substituent on the heterocycle.

Preferably, $R_1$ is a hydrogen atom, an alkyl group having 1 to 8 carbon atoms, an aryl group having 6 to 10 carbon atoms, an aralkyl group having 7 to 10 carbon atoms, or a heterocyclic group having 6 to 10 carbon atoms. In particular, $R_1$ of the dye A is preferably a hydrogen atom and $R_1$ of the dye B is preferably a methyl group, a phenyl group, or a chlorine atom.

$R_2$ and $R_3$ each independently represents an alkyl group, an alkenyl group, an alkynyl group, an aralkyl group, an aryl group, or a heterocyclic group. $R_2$ and $R_3$ may be the same as or different from each other.

The alkyl group represented by $R_2$ or $R_3$ is preferably a substituted or unsubstituted alkyl group having 1 to 18 carbon atoms and more preferably a substituted or unsubstituted alkyl group having 1 to 8 carbon atoms. The alkyl group may be straight-chain, branched, or cyclic. Examples of the alkyl group include methyl, ethyl, n-propyl, isopropyl, n-butyl, isobutyl, t-butyl, n-hexyl, neopentyl, cyclohexyl, adamantyl, and cyclopropyl.

Examples of the substituent of the alkyl group include the following groups: a substituted or unsubstituted alkenyl group having 2 to 18 carbon atoms (preferably 2 to 8 carbon atoms) (e.g., vinyl); a substituted or unsubstituted alkynyl group having 2 to 18 carbon atoms (preferably 2 to 8 carbon atoms) (e.g., ethynyl); a substituted or unsubstituted aryl group having 6 to 10 carbon atoms (e.g., phenyl or naphthyl); a halogen atom (e.g., F, Cl, Br, or the like), a substituted or unsubstituted alkoxy group having 1 to 18 carbon atoms (preferably 1 to 8 carbon atoms) (e.g., methoxy or ethoxy); a substituted or unsubstituted aryloxy group having 6 to 10 carbon atoms (e.g., phenoxy or p-methoxyphenoxy); a substituted or unsubstituted alkylthio group having 1 to 18 carbon atoms (preferably 1 to 8 carbon atoms) (e.g., methylthio or ethylthio); a substituted or unsubstituted arylthio group having 6 to 10 carbon atoms (e.g., phenylthio); a substituted or unsubstituted acyl group having 2 to 18 carbon atoms (preferably 2 to 8 carbon atoms) (e.g., acetyl or propionyl);

a substituted or unsubstituted alkylsulfonyl or arylsulfonyl group having 1 to 18 carbon atoms (preferably 1 to 8 carbon atoms) (e.g., methanesulfonyl or p-toluenesulfonyl); a substituted or unsubstituted acyloxy group having 2 to 18 carbon atoms (preferably 2 to 8 carbon atoms) (e.g., acetoxy or propionyloxy); a substituted or unsubstituted alkoxycarbonyl group having 2 to 18 carbon atoms (preferably 2 to 8 carbon atoms) (e.g., methoxycarbonyl or ethoxycarbonyl); a substituted or unsubstituted aryloxycarbonyl group having 7 to 11 carbon atoms (e.g., naphthoxycarbonyl); an unsubstituted amino group or a substituted amino group having 1 to 18 carbon atoms (preferably 1 to 8 carbon atoms) (e.g., methylamino, dimethylamino, diethylamino, anilino, methoxyphenylamino, chlorophenylamino, pyridylamino, methoxycarbonylamino, n-butoxycarbonylamino, phenoxycarbonylamino, methylcarbamoylamino, ethylthiocarbamoylamino, phenylcarbamoylamino, acetylamino, ethylcarbonylamino, cyclohexylcarbonylamino, benzoylamino, chloroacetylamino, or methylsulfonylamino);

a substituted or unsubstituted carbamoyl group having 1 to 18 carbon atoms (preferably 1 to 8 carbon atoms) (e.g., unsubstituted carbamoyl, methylcarbamoyl, ethylcarbamoyl, n-butylcarbamoyl, t-butylcarbamoyl, dimethylcarbamoyl, morpholinocarbamoyl, or pyrrolidinocarbamoyl); an unsubstituted sulfamoyl group or a substituted sulfamoyl group having 1 to 18 carbon atoms (preferably 1 to 8 carbon atoms) (e.g., methylsulfamoyl or phenylsulfamoyl); a cyano group; a nitro group; a carboxyl group; a hydroxyl group; a heterocyclic group (e.g., oxazolyl, benzoxazolyl, thiazolyl, benzothiazolyl, imidazolyl, benzimidazolyl, indolenyl, pyridyl, piperidyl, pyrrolidyl, morpholinyl, sulfolanyl, furanyl, thiophenyl, pyrazolyl, pyrrolyl, chromanyl, or coumarinyl).

The alkenyl group represented by $R_2$ or $R_3$ is preferably a substituted or unsubstituted alkenyl group having 2 to 18 carbon atoms and more preferably a substituted or unsubstituted alkenyl group having 2 to 8 carbon atoms. Examples of the alkenyl group include vinyl, allyl, 1-propenyl, and 1,3-butadienyl. The substituents of the alkenyl group are preferably the substituents listed for the alkyl group.

The alkynyl group represented by $R_2$ or $R_3$ is preferably a substituted or unsubstituted alkynyl group having 2 to 18 carbon atoms and more preferably a substituted or unsubstituted alkynyl group having 2 to 8 carbon atoms. Examples of the alkynyl group include ethynyl and 2-propynyl. The substituents of the alkynyl group are preferably the substituents listed for the alkyl group.

The aralkyl group represented by $R_2$ or $R_3$ is preferably a substituted or unsubstituted aralkyl group having 7 to 18 carbon atoms. For example, the aralkyl group is preferably benzyl or methylbenzyl. The substituents of the aralkyl group include the substituents listed for the alkyl group.

The aryl group represented by $R_2$ or $R_3$ is preferably a substituted or unsubstituted aryl group having 6 to 18 carbon atoms. Preferred examples of the aryl group include phenyl and naphthyl. The substituents of the aryl group are preferably the substituents listed for the alkyl group. Besides these substituents, an alkyl group (e.g., methyl, ethyl, or the like) is also preferable.

The heterocyclic groups represented by $R_2$ or $R_3$ are 5- to 6-membered, saturated or unsaturated heterocyclic groups made up of carbon atoms, nitrogen atoms, oxygen atoms and sulfur atoms. Examples of the heterocyclic groups include oxazolyl, benzoxazolyl, thiazolyl, benzothiazolyl, imidazolyl, benzimidazolyl, indolenyl, pyridyl, piperidyl, pyrrolidyl, morpholinyl, sulfolanyl, furanyl, thiophenyl, pyrazolyl, pyrrolyl, chromanyl, and coumarinyl. The heterocyclic group may have a substituent and preferred examples of this substituent are the substituents listed for the alkyl group.

Specific examples of the oxonol-based dye represented by the general formula (1) are given below. In the following examples, bipyridyl is expressed as (pyridyl)2.

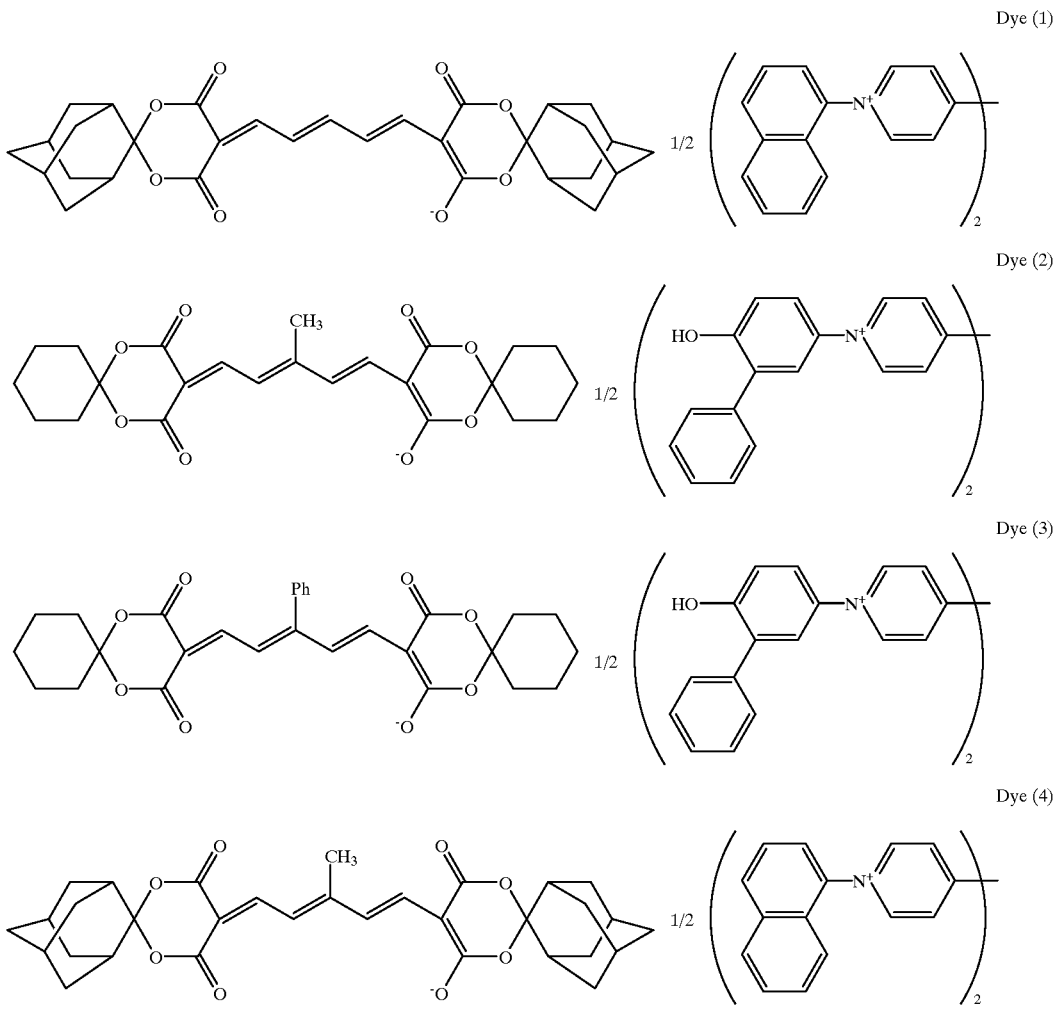

-continued
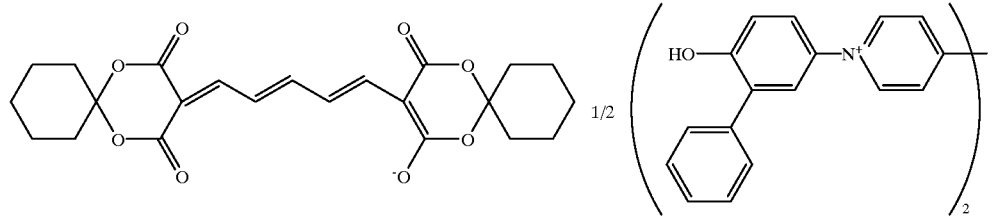
Dye (5)
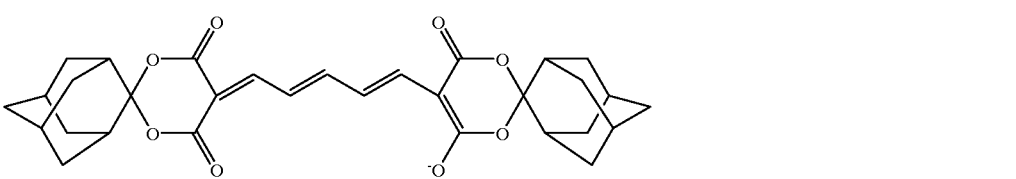
Dye (6)
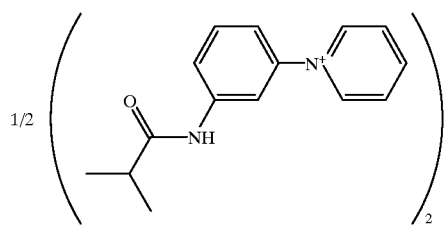
Dye (7)
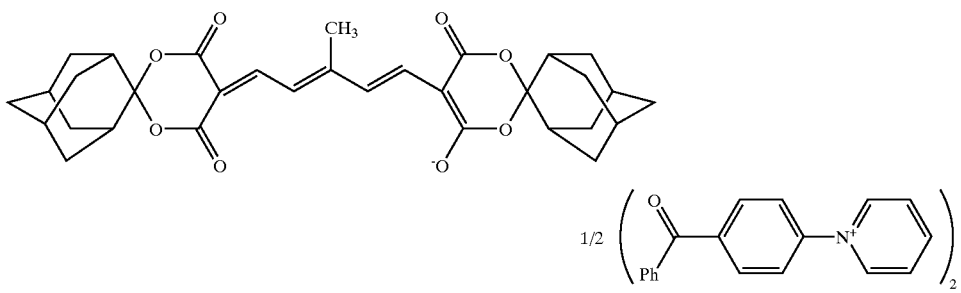
Dye (8)
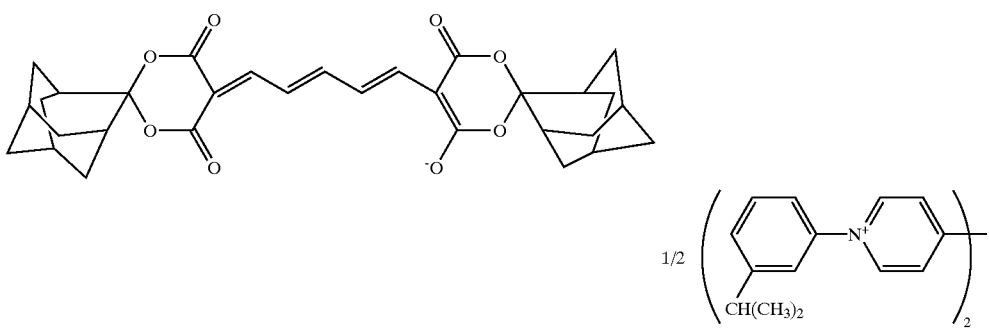
Dye (9)
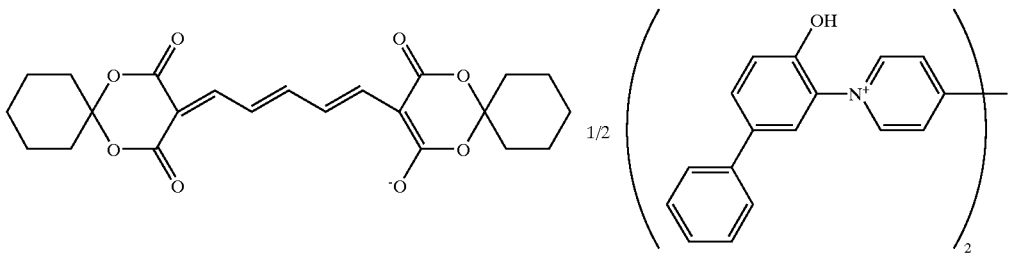

-continued
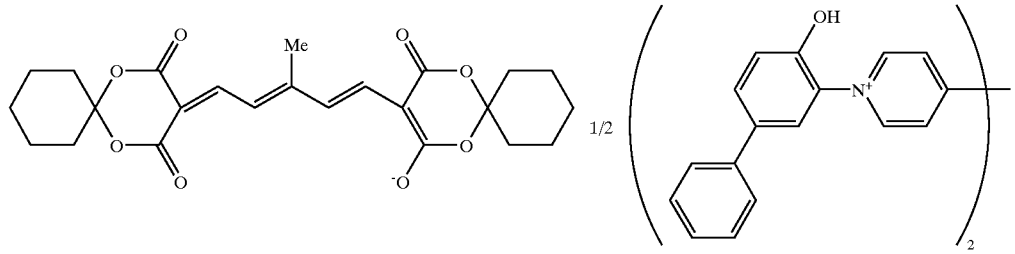
Dye (10)
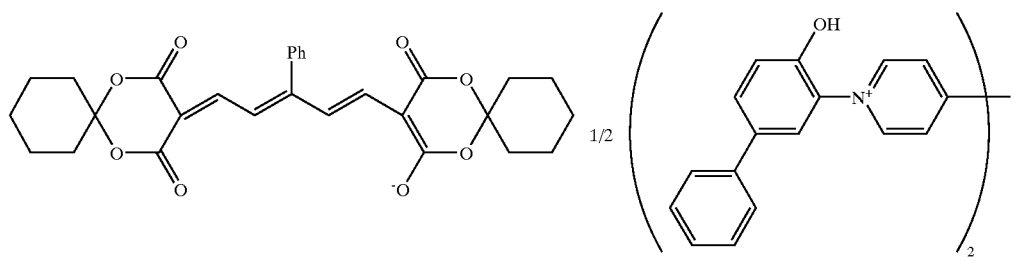
Dye (11)
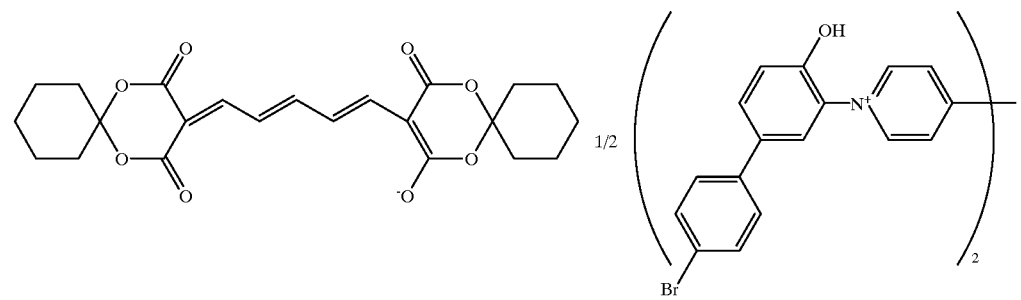
Dye (12)
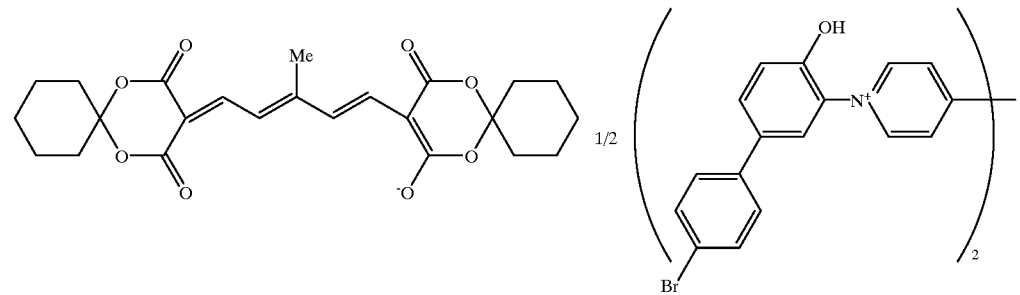
Dye (13)
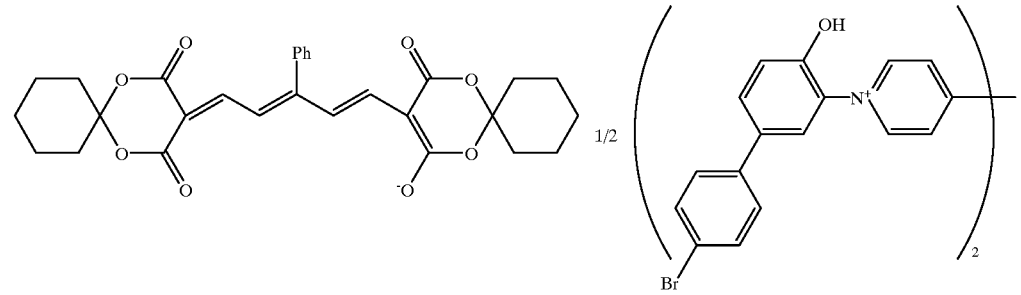
Dye (14)

Preferably, the optical information storage medium of the present invention includes a discoid transparent substrate which is pregrooved with a certain track pitch and has thereon a dye recording layer, a light-reflective layer, and a protective layer, provided in the order listed. In another preferred structure, the optical information storage medium of the present invention is made up of two disks, each including a discoid transparent substrate which is pregrooved at a certain track pitch and has thereon a dye recording layer and the light-reflective layer, and the disks are adhered to each other such that the dye recording layers face inward.

The optical information storage medium of the present invention can be manufactured, for example, by the following method. A material for use as the substrate of the optical information storage medium may be freely selected from materials hitherto used as substrates for conventional optical information storage media. Examples of the substrate material include glass, polycarbonate, acrylic resins such as polymethyl methacrylate, vinyl chloride-based resins such as polyvinyl chloride and copolymers of vinyl chloride, epoxy resins, amorphous polyolefins, and polyesters. If necessary, these materials may be used in combination. These materials may be used as a film or as a rigid substrate. Among the materials listed above, polycarbonate is preferable from the standpoints of moisture resistance, dimensional stability, and cost.

Further, on a surface of the substrate at a side thereof that is to have the dye recording layer, a primer layer may be provided for such purposes as improvement of surface smoothness, improvement of adhesion, and protection of the dye recording layer. Examples of a material for the primer layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate, and the like; and surface-modifying agents such as silane coupling agents. The primer layer can be formed by preparing a coating liquid by dissolving or dispersing the above-mentioned material in a suitable solvent, and applying the coating liquid to the substrate surface by a method such as spin coating, dip coating, extrusion coating, or the like. The thickness of the primer layer is generally in the range of 0.005 to 20 $\mu$m and preferably in the range of 0.01 to 10 $\mu$m.

The dye recording layer can be formed by preparing a coating liquid by dissolving the above-mentioned dye and optional components such as a browning inhibitor and a binder in a suitable solvent, applying the coating liquid to the substrate surface to form a layer, and drying the layer. Examples of the solvent for preparing the coating liquid to form the dye recording layer include esters such as butyl acetate and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as cyclohexane; ethers such as tetrahydrofuran, ethyl ether, and dioxane; alcohols such as ethanol, n-propanol, isopropanol, n-butanol, and diacetone alcohol; fluorine-based solvents such as 2,2,3,3-tetrafluoropropanol; and glycol ethers such as ethylene glycol monomethyl ether, ethylene glycol monoethyl ether, and propylene glycol monomethyl ether. These solvents may be used singly or in a combination of two or more, taking into consideration the solubility of the dyes to be used. Further, according to purposes, the coating liquid may contain additives such as an antioxidant, a UV absorber, a plasticizer, a lubricating agent and the like.

A browning inhibitor whose maximum absorption wavelength lies on a longer wavelength side relative to the recording wavelength is preferable as the browning inhibitor. The browning inhibitor may contain various compounds hitherto known as singlet oxygen quenchers. Typical examples of the quenchers include metal complexes represented by the general formulae (III), (IV), and (V) in Japanese Patent Application Laid-Open (JP-A) No. 3-224793, diimmonium salts, aminium salts, and nitroso compounds described in JP-A Nos. 2-300287 and 2-300288.

If a binder is used, examples of the binder include naturally occurring organic polymeric substances such as gelatin, cellulose derivatives, dextran, rosin, and rubber; and synthetic organic polymers such as hydrocarbon-based resins, e.g., polyethylene, polypropylene, polystyrene, and polyisobutylene, vinyl-based resins, e.g., polyvinyl chloride, polyvinylidene chloride, and vinyl chloride/vinyl acetate copolymers, acrylic resins, e.g., polymethyl acrylate and polymethyl methacrylate, polyvinyl alcohol, chlorinated polyethylene, epoxy resins, butyral resins, rubber derivatives, and initial-stage condensation products of thermosetting resins such as phenol/formaldehyde resins. If the binder is used as a material for the dye recording layer, the amount of the binder to be used is generally in the range of 0.01 to 50 times the amount of the dye (by mass ratio), and preferably in the range of 0.1 to 5 times. The dye concentration of the coating liquid thus prepared is generally in the range of 0.01 to 10% by mass and preferably in the range of 0.1 to 5% by mass.

Examples of the method for applying the coating liquid to the substrate include spraying, spin coating, dip coating, roll coating, blade coating, doctor roll coating, and screen printing. The dye recording layer may be composed of a single layer or plural layers. The layer thickness of the dye recording layer is generally in the range of 20 to 500 nm, preferably in the range of 20 to 100 nm, more preferably in the range of 30 to 90 nm, and particularly preferably in the range of 40 to 80 nm. The thickness of the dye recording layer is a value obtained by averaging the thickness at lands and the thickness at grooves in proportion to the area occupied by lands and the area occupied by grooves in the recording area. The thickness at a land is defined as the thickness of the dye recording layer at the center of the land in a width direction and the thickness at a groove is defined as the thickness of the dye recording layer at the center of the groove in a width direction.

It is preferable if a light-reflective layer is provided on the dye recording layer, in order to raise reflectivity at the time of reproduction of information. A light-reflective substance as a material for the light-reflective layer is a substance having a high reflectivity to a laser. Examples of the substance include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. Among these substances, Cr, Ni, Pt, Cu, Ag, Au, Al, and stainless steel are preferable. Ag and Au are more preferable. Ag is particularly preferable. These substances may be used singly or in a combination of two or more, or alternatively as an alloy. The light-reflective layer can be formed by, for example, vacuum-deposition, sputtering, or ion-plating of the above-mentioned light-reflective substance onto the dye recording layer. The layer thickness of the light-reflective layer is generally in a range of from 10 to 300 nm and preferably in a range of from 50 to 200 nm.

For such purposes as physically and chemically protecting the dye recording layer and the like, a protective layer is preferably provided on the light-reflective layer. If the same construction as in the manufacture of a DVD-R type optical information storage medium, i.e., the construction in which the two substrates are adhered to each other such that the dye recording layers face inward, is employed, the formation of the protective layer is not necessarily required. Examples of a material for use in the protective layer include inorganic substances such as SiO, $SiO_2$, $MgF_2$, $SnO_2$, and $Si_3N_4$, and organic substances such as thermoplastic resins, thermosetting resins, and UV-curable resins.

The protective layer can be formed by, for example, laminating a film obtained by extrusion of a plastic onto the reflective layer via an adhesive. Alternatively, the protective layer may be formed by vacuum deposition, sputtering, coating, or the like. If the protective layer is made of a thermoplastic or thermosetting resin, the protective layer can also be formed by preparing a coating liquid by dissolving the resin in a suitable solvent, applying the coating liquid to the reflective layer, and drying the coating layer. If the protective layer is made of a UV-curable resin, the protective layer can also be formed by applying the resin as it is or applying a coating liquid prepared by dissolving the resin in a suitable solvent to the reflective layer and irradiating the coating layer with UV light so that the layer is hardened. According to purposes, the coating liquid may further contain additives such as an antistatic agent, an antioxidant, a UV absorber, and the like. The thickness of the protective layer is generally in the range of 0.1 to 100 µm. According to the procedures described above, a laminated body including a substrate having disposed thereon a dye recording layer, a light-reflective layer, and a protective layer can be manufactured.

An optical information recording method of the present invention using the optical information storage medium is implemented, for example, as follows. First, the optical information storage medium is rotated at a constant linear velocity (i.e., 1.2 to 14 m/sec for CD format) or at a constant angular velocity, and the rotating optical information storage medium is irradiated with recording light such as a semiconductor laser from the substrate side or from the protective layer side. The light irradiation causes the reflectivity to change by void formation at the interface between the dye recording layer and the reflective layer (the void formation is accompanied by deformation of the dye recording layer or reflective layer or by deformation of both layers), by bulging deformation of the substrate, or by a change in color or association in the dye recording layer. The change in the reflectivity thus caused is believed to result in the recording of information.

In the present invention, a semiconductor laser having an oscillation wavelength in the range of 300 to 700 nm can be used as the recording light.

Although the explanation described above relates to the example of a CD-R type optical information storage medium, the optical information storage medium of the present invention can also be applied to a DVD-R type optical information storage medium which enables recording at a higher density. The construction of the DVD-R type optical information storage medium is basically the same as the construction of the CD-R type optical information storage medium except that, in the DVD-R type optical information storage medium, the track pitch formed in the transparent substrate is 0.6 to 0.9 µm, which is narrower than that of the CD-R type optical information storage medium.

A DVD-R type optical information storage medium having two dye recording layers put together can be manufactured by bonding, using an adhesive or the like, two laminated bodies each having the above-described construction such that the dye recording layers face inward. Otherwise, a DVD-R type optical information storage medium having a dye recording layer only on one side can be manufactured by bonding, using an adhesive or the like, a laminated body having the above-described construction and a discoid protective substrate having roughly the same size as that of the substrate of the laminated body such that the dye recording layer faces inward. When put together, a transparent substrate having a diameter in the range of 120±3 mm and a thickness in the range of 0.6±0.1 mm is generally used. The thickness of the optical information storage medium after being put together is controlled to within a range of 1.2±0.2 mm.

In order to obtain a higher recording density, the optical information storage medium of the present invention can use a substrate having pregrooves whose track pitch is 0.3 to 0.8 µm, which is narrower than that of CD-R or DVD-R. More preferably, the track pitch of the optical information storage medium of the present invention is 0.4 to 0.6 µm.

The present invention provides an optical information storage medium having a small jitter value and a high recording sensitivity.

EXAMPLES

The present invention is explained in more detail by way of examples given below. It should be noted that the present invention is not limited to the following examples.

Example 1

Preparation of Optical Disks

A polycarbonate substrate (having a thickness of 0.6 mm, an outer diameter of 120 mm, an inner diameter of 15 mm: tradename "PANLITE AD5503" manufactured by Teijin Ltd.), which had spiral pregrooves provided thereon, was made by injection molding.

10 g of the oxonol-based dye (4) and 0.5 g of the oxonol-based dye (6) were dissolved in 100 mL of 2,2,3,3-tetrafluoro-1-propanol to thereby obtain a coating liquid. The coating liquid was spin-coated onto the surface of the pregroove side of the polycarbonate substrate while varying speed of revolution from 300 to 3000 rpm. Then, the coating layer was dried and thus a dye recording layer (having a thickness of about 100 nm at the pregrooves) was formed.

The maximum absorption wavelength of each of the dyes, the maximum recording power of each of the dyes, the difference between the wavelengths of the dyes, and the sensitivity ratio Q between the dyes were as follows.

Dye (4): maximum absorption wavelength:568.4 nm; maximum recording power:12.0 mW Dye (6): maximum absorption wavelength:594.3 nm; maximum recording power:7.0 mW Difference between the wavelengths of the dyes (4) and (6):25.9 nm Sensitivity ratio Q between the dyes (4) and (6):0.42

Next, a light-reflective layer made of Ag and having a thickness of about 70 nm was formed by DC sputtering on the dye recording layer in an argon atmosphere. Further, a UV-curable resin (tradename "SD 318" manufactured by Dainippon Ink and Chemicals Inc.) was spin-coated onto the light-reflective layer while varying speed of revolution from 60 to 4000 rpm. Then, the coating layer was irradiated with ultraviolet light from a high-pressure mercury lamp to cure the coating layer. In this way, a protective layer having a thickness of 7 µm was formed. Surface hardness, expressed as a pencil scratch hardness, was 2H. According to the above-described steps, a laminated body which included a substrate, and a dye recording layer and a light-reflective layer provided on the substrate in the order listed, was obtained.

A polycarbonate discoid protective substrate (having a diameter of 120 mm and a thickness of 0.6 mm), which had only a light-reflective layer and a protective layer thereon, was prepared. In addition, a laminated body which included a substrate, and a dye recording layer, a light-reflective layer and a protective layer laminated on the substrate in the order listed, as described above, was prepared. Next, a delayed-curing type adhesive (a cation-curing epoxy resin, tradename "SK7000", manufactured by Sony Chemical Corp.) was coated by screen printing. The thickness of each of the adhesive layers was 17 μm. The laminated body described above and the substrate, which had only a light-reflective layer and a protective layer thereon, was put together such that the substrate sides faced inwardly. According to the above-described steps, a DVD-R type optical disk (1) according to the present invention was manufactured.

A DVD-R type optical disk (2) for comparison was manufactured in the same way as in Example 1, except that the dye recording layer was formed using a coating liquid obtained by dissolving 1.5 g of the oxonol-based dye (4) in 100 mL of the solvent. A DVD-R type optical disk (3) for comparison was manufactured in the same way as in Example 1, except that the dye recording layer was formed using a coating liquid obtained by dissolving 1.5 g of the oxonol-based dye (6) in 100 mL of the solvent.

Assessment of the Optical Information Recording Media

By using an assessing machine "DDU1000" manufactured by Pulsetec Corp., 8–16 modulated signals were recorded on the thus manufactured DVD-R type optical disks by means of a semiconductor laser having a wavelength of 650 nm (pickup NA 0.6) at a linear velocity of 3.49 m/s. After recording, the signals were reproduced using a laser having the same wavelength at a power of 0.5 mW and the jitter was measured. Scattering of the recorded pit signal lengths was measured using a time interval analyzer and a standard deviation a was defined as the jitter. The smaller this value, the better the jitter is. In addition, the optimum recording power, at which the jitter became the lowest when the recording power was varied, was measured. The results obtained are shown in Table 1.

TABLE 1

| | Dye | Difference between the wavelengths (nm) | Sensi-tivity ratio Q | Mixing ratio (A:B) | Optimum recording power (mw) | Jitter (%) |
|---|---|---|---|---|---|---|
| Optical disk (1) | (4) and (6) | 25.9 | 0.42 | 2:1 | 9.1 | 8.0 |
| Optical disk (2) | (4) | — | — | — | 12 | 11.1 |
| Optical disk (3) | (6) | — | — | — | 7 | 11.7 |

From Table 1, it can be seen that the DVD-R type optical disk (1), whose recording layer contains two kinds of the dyes, each fulfilling the requirements of the present invention, could maintain recording sensitivity at a value approximately equal to the average of the recording sensitivities of the two dyes. Also, it can be seen that the jitter of the DVD-R type optical disk (1) was remarkably improved relative to the DVD-R type optical disks (2) and (3) each using a single kind of dye.

Example 2

A DVD-R type optical disk (4) according to the present invention was manufactured in the same way as in Example 1, except that the dye recording layer was formed using a coating liquid obtained by dissolving 10 g of the oxonol-based dye (8) and 0.5 g of the oxonol-based dye (6) in 100 mL of 2,2,3,3-tetrafluoro-1-propanol.

The maximum absorption wavelength of each of the dyes, the maximum recording power of each of the dyes, the difference between the wavelengths of the dyes, and the sensitivity ratio Q between the dyes were as follows.

Dye (8): maximum absorption wavelength:568.1 nm; maximum recording power:10.6 mW Dye (6): maximum absorption wavelength:594.3 nm; maximum recording power:7.0 mW Difference between the wavelengths of the dyes (8) and (6):26.2 nm Sensitivity ratio Q between the dyes (8) and (6):0.34

A DVD-R type optical disk (5) for comparison was manufactured in the same way as in Example 1, except that the dye recording layer was formed using a coating liquid obtained by dissolving 1.5 g of the oxonol-based dye (8) in 100 mL of the solvent.

The jitter and optimum recording power of each of the DVD-R type optical disks obtained above were measured in the same way as in Example 1. The results obtained are shown in Table 2.

TABLE 2

| | Dye | Difference between the wavelengths (nm) | Sensi-tivity ratio Q | Mixing ratio (A:B) | Optimum recording power (mw) | Jitter (%) |
|---|---|---|---|---|---|---|
| Optical disk (4) | (8) and (6) | 26.2 | 0.34 | 2:1 | 9.2 | 8.8 |
| Optical disk (5) | (8) | — | — | — | 10.6 | 9.2 |
| Optical disk (3) | (6) | — | — | — | 7 | 11.7 |

From Table 2, it can be seen that the DVD-R type optical disk (4), whose recording layer contains two kinds of the dyes, each fulfilling the requirements of the present invention, could maintain recording sensitivity at a value approximately equal to the average of the recording sensitivities of the two dyes. Also, it can be seen that the jitter of the DVD-R type optical disk (4) was remarkably improved relative to the DVD-R type optical disks (5) and (3) each using a single kind of dye.

Comparative Example 1

A DVD-R type optical disk (6) for comparison was manufactured in the same way as in Example 1, except that the dye recording layer was formed using a coating liquid obtained by dissolving 1.2 g of the oxonol-based dye (4) and 0.3 g of the following dye (18) in 100 mL of 2,2,3,3-tetrafluoro-1-propanol.

Dye (18)

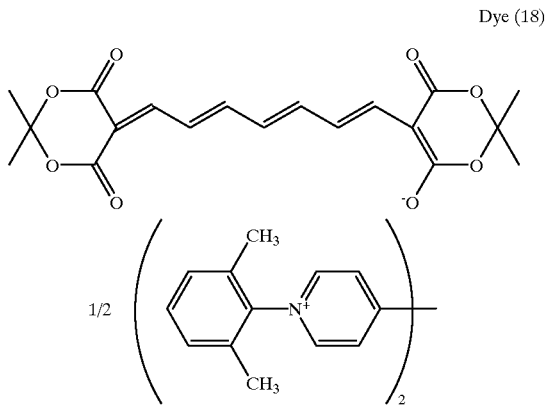

A DVD-R type optical disk (7) for comparison was manufactured in the same way as in Example 1, except that the dye recording layer was formed using a coating liquid obtained by dissolving 1.4 g of the oxonol-based dye (4) and 0.1 g of the dye (18) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (4): maximum absorption wavelength:568.4 nm; maximum recording power:12.0 mW Dye (18): maximum absorption wavelength:670.2 nm; maximum recording power:7.0 mW Difference between the wavelengths of the dyes (4) and (18):100.8 nm Sensitivity ratio Q between the dyes (4) and (18):0.42

A DVD-R type optical disk (8) for comparison was manufactured in the same way as in Example 1, except that the dye recording layer was formed using a coating liquid obtained by dissolving 1.5 g of the dye (18) in 100 mL of the solvent.

The jitter and optimum recording power of each of the DVD-R type optical disks obtained above were measured in the same way as in Example 1. The results obtained are shown in Table 3.

TABLE 3

| | Dye | Difference between the wavelengths (nm) | Sensitivity ratio Q | Mixing ratio (A:B) | Optimum recording power (mw) | Jitter (%) |
|---|---|---|---|---|---|---|
| Optical disk (6) | (4) and (18) | 100.8 | 0.42 | 4:1 | 7.0 | >20 |
| Optical disk (7) | (4) and (18) | 100.8 | 0.42 | 14:1 | 7.2 | >20 |
| Optical disk (2) | (4) | — | — | — | 12 | 11.1 |
| Optical disk (8) | (18) | — | — | — | 7 | >20 |

From Table 3, it can be seen that the DVD-R type optical disks (6) and (7) of the Comparative Examples containing two kinds of dye having a large difference between the wavelengths, i.e., 100.8 nm, could maintain recording sensitivity at a value approximately equal to the average of the recording sensitivities of the two dyes but the jitter values of the DVD-R type optical disks (6) and (7) were contrarily inferior to the DVD-R type optical disks (2) and (8) each using a single kind of dye.

Comparative Example 2

A DVD-R type optical disk (9) for comparison was manufactured in the same way as in Example 1, except that the dye recording layer was formed using a coating liquid obtained by dissolving 0.75 g of the oxonol-based dye (4) and 0.75 g of the oxonol-based dye (1) in 100 mL of 2,2,3,3-tetrafluoro-1-propanol. Further, a DVD-R type optical disk (10) for comparison was manufactured in the same way as in Example 1, except that the dye recording layer was formed using a coating liquid obtained by dissolving 1.2 g of the oxonol-based dye (4) and 0.3 g of the oxonol-based dye (1) in 100 mL of the solvent. Furthermore, a DVD-R type optical disk (11) for comparison was manufactured in the same way as in Example 1, except that the dye recording layer was formed using a coating liquid obtained by dissolving 1.4 g of the oxonol-based dye (4) and 0.1 g of the oxonol-based dye (1) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (4): maximum absorption wavelength:568.4 nm; maximum recording power:12.0 mW Dye (1): maximum absorption wavelength:569.4 nm; maximum recording power:10.0 mW Difference between the wavelengths of the dyes (4) and (1):1.0 nm Sensitivity ratio Q between the dyes (4) and (1):0.16

A DVD-R type optical disk (12) for comparison was manufactured in the same way as in Example 1, except that the dye recording layer was formed using a coating liquid obtained by dissolving 1.5 g of the dye (1) in 100 mL of the solvent.

The jitter and optimum recording power of each of the DVD-R type optical disks obtained above were measured in the same way as in Example 1. The results obtained are shown in Table 4.

TABLE 4

| | Dye | Difference between the wavelengths (nm) | Sensitivity ratio Q | Mixing ratio (A:B) | Optimum recording power (mw) | Jitter (%) |
|---|---|---|---|---|---|---|
| Optical disk (9) | (4) and (1) | 1.0 | 0.16 | 1:1 | 12.2 | 11.5 |
| Optical disk (10) | (4) and (1) | 1.0 | 0.16 | 4:1 | 11.8 | 12.0 |
| Optical disk (11) | (4) and (1) | 1.0 | 0.16 | 14:1 | 12.0 | 11.4 |
| Optical disk (2) | (4) | — | — | — | 12.0 | 11.1 |
| Optical disk (12) | (1) | — | — | — | 10.0 | 9.3 |

From Table 4, it can be seen that the DVD-R type optical disks (9) to (11) of the Comparative Examples containing two kinds of dye having a small difference between the wavelengths, i.e., 1.0 nm, and a small sensitivity ratio Q, i.e., 0.16, could maintain recording sensitivity at a value approximately equal to the average of the recording sensitivities of the two dyes but the jitter values of the DVD-R type optical disks (9) to (11) were contrarily inferior to the DVD-R type optical disks (2) and (12) each using a single kind of dye.

Comparative Example 3

A DVD-R type optical disk (13) for comparison was manufactured in the same way as in Example 1, except that the dye recording layer was formed using a coating liquid obtained by dissolving 0.75 g of the oxonol-based dye (4) and 0.75 g of the following dye (15) in 100 mL of 2,2,3,3-tetrafluoro-1-propanol.

Dye (15)

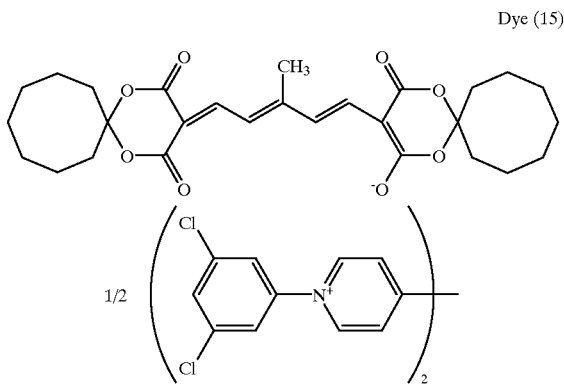

Further, a DVD-R type optical disk (14) for comparison was manufactured in the same way as in Example 1, except that the dye recording layer was formed using a coating liquid obtained by dissolving 1.2 g of the oxonol-based dye (4) and 0.3 g of the dye (15) in 100 mL of the solvent. Furthermore, a DVD-R type optical disk (15) for comparison was manufactured in the same way as in Example 1, except that the dye recording layer was formed using a coating liquid obtained by dissolving 1.4 g of the oxonol-based dye (4) and 0.1 g of the dye (15) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (4): maximum absorption wavelength:568.4 nm; maximum recording power:12.0 mW Dye (15): maximum absorption wavelength:596.6 nm; maximum recording power:10.0 mW Difference between the wavelengths of the dyes (4) and (15):28.2 nm Sensitivity ratio Q between the dyes (4) and (15):0.16

A DVD-R type optical disk (16) for comparison was manufactured in the same way as in Example 1, except that the dye recording layer was formed using a coating liquid obtained by dissolving 1.5 g of the dye (15) in 100 mL of the solvent.

The jitter and optimum recording power of each of the DVD-R type optical disks obtained above were measured in the same way as in Example 1. The results obtained are shown in Table 5.

TABLE 5

| Dye | | Difference between the wavelengths (nm) | Sensitivity ratio Q | Mixing ratio (A:B) | Optimum recording power (mw) | Jitter (%) |
|---|---|---|---|---|---|---|
| Optical disk (13) | (4) and (15) | 28.2 | 0.16 | 1:1 | 11.0 | 14.8 |
| Optical disk (14) | (4) and (15) | 28.2 | 0.16 | 4:1 | 11.2 | 14.6 |
| Optical disk (15) | (4) and (15) | 28.2 | 0.16 | 14:1 | 11.7 | 14.2 |

TABLE 5-continued

| Dye | | Difference between the wavelengths (nm) | Sensitivity ratio Q | Mixing ratio (A:B) | Optimum recording power (mw) | Jitter (%) |
|---|---|---|---|---|---|---|
| Optical disk (2) | (4) | — | — | — | 12 | 11.1 |
| Optical disk (16) | (15) | — | — | — | 10.0 | 14.6 |

As can be seen from Table 5, the DVD-R type optical disks (13) to (15) of the Comparative Examples containing two kinds of dye having a small sensitivity ratio Q between the two kinds of dye, i.e., 0.16, could maintain recording sensitivity at a value approximately equal to the average of the recording sensitivities of the two dyes but the jitter values of the DVD-R type optical disks (13) to (15) were contrarily inferior to the DVD-R type optical disks (2) and (16) each using a single kind of dye.

Comparative Example 4

A DVD-R type optical disk (17) for comparison was manufactured in the same way as in Example 1, except that the dye recording layer was formed using a coating liquid obtained by dissolving 0.75 g of the following dye (16) and 0.75 g of the following dye (17) in 100 mL of 2,2,3,3-tetrafluoro-1-propanol.

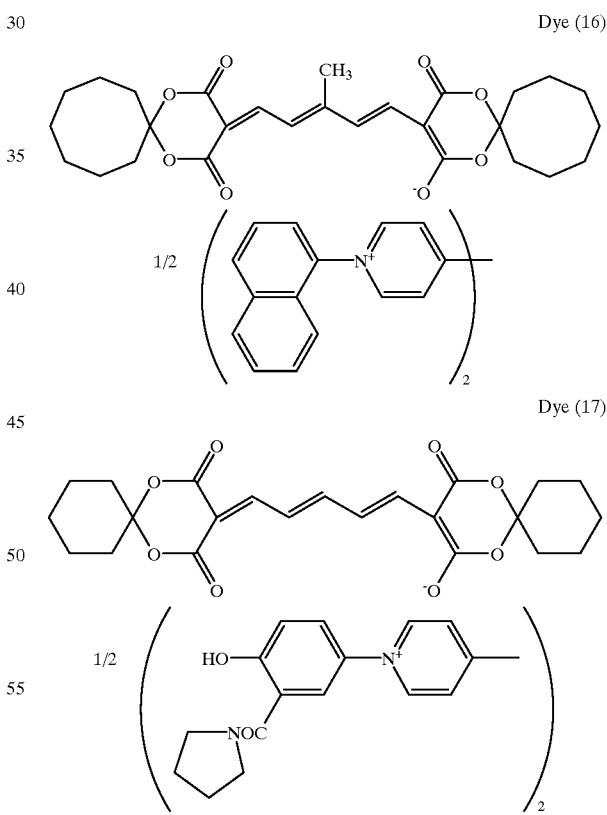

Dye (16)

Dye (17)

Further, a DVD-R type optical disk (18) for comparison was manufactured in the same way as in Example 1, except that the dye recording layer was formed using a coating liquid obtained by dissolving 1.2 g of the dye (17) and 0.3 g of the dye (16) in 100 mL of the solvent. Furthermore, a DVD-R type optical disk (19) for comparison was manufactured in the same way as in Example 1, except that the dye recording layer was formed using a coating liquid obtained by dissolving 1.4 g of the dye (17) and 0.1 g of the dye (16) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (17): maximum absorption wavelength:567.4 nm; maximum recording power:13.5 mW Dye (16): maximum absorption wavelength:598.8 nm; maximum recording power:6.0 mW Difference between the wavelengths of the dyes (17) and (16):31.4 nm Sensitivity ratio Q between the dyes (17) and (16):0.56

Further, a DVD-R type optical disk (20) for comparison was manufactured in the same way as in Example 1, except that the dye recording layer was formed using a coating liquid obtained by dissolving 1.5 g of the dye (17) in 100 mL of the solvent. Furthermore, a DVD-R type optical disk (21) for comparison was manufactured in the same way as in Example 1, except that the dye recording layer was formed using a coating liquid obtained by dissolving 1.5 g of the dye (16) in 100 mL of the solvent.

The jitter and optimum recording power of each of the DVD-R type optical disks obtained above were measured in the same way as in Example 1. The results obtained are shown in Table 6.

TABLE 6

| Dye | | Difference between the wavelengths (nm) | Sensitivity ratio Q | Mixing ratio (A:B) | Optimum recording power (mw) | Jitter (%) |
|---|---|---|---|---|---|---|
| Optical disk (17) | (17) and (16) | 31.4 | 0.56 | 1:1 | 8.0 | 14.2 |
| Optical disk (18) | (17) and (16) | 31.4 | 0.56 | 4:1 | 9.2 | 14.5 |
| Optical disk (19) | (17) and (16) | 31.4 | 0.56 | 14:1 | 12.2 | 14.0 |
| Optical disk (20) | (17) | — | — | — | 13.5 | 12.6 |
| Optical disk (21) | (16) | — | — | — | 6.0 | 14.0 |

As can be seen from Table 6, the DVD-R type optical disks (17) to (19) of the Comparative Examples containing two kinds of dye having a large sensitivity ratio Q between the two kinds of dye, i.e., 0.56, could maintain recording sensitivity at a value approximately equal to the average of the recording sensitivities of the two dyes but the jitter values of the DVD-R type optical disks (17) to (19) were contrarily inferior to the DVD-R type optical disks (20) and (21) each using a single kind of dye.

Example 3

A DVD-R type optical disk (22) according to the present invention was manufactured in the same way as in Example 1, except that the dye recording layer was formed using a coating liquid obtained by dissolving 1.2 g of the oxonol-based dye (9) and 0.3 g of the oxonol-based dye (10) in 100 mL of 2,2,3,3-tetrafluoro-1-propanol.

Further, a DVD-R type optical disk (23) for comparison was manufactured in the same way as in Example 1, except that the dye recording layer was formed using a coating liquid obtained by dissolving 1.125 g of the dye (9) and 0.375 g of the dye (10) in 100 mL of the solvent.

Furthermore, a DVD-R type optical disk (24) for comparison was manufactured in the same way as in Example 1, except that the dye recording layer was formed using a coating liquid obtained by dissolving 10 g of the dye (9) and 0.5 g of the dye (10) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (9): maximum absorption wavelength:571.0 nm; maximum recording power:12.3 mW Dye (10): maximum absorption wavelength:575.8 nm; maximum recording power:7.0 mW Difference between the wavelengths of the dyes (9) and (10):4.8 nm Sensitivity ratio Q between the dyes (9) and (10):0.43

Further, a DVD-R type optical disk (25) for comparison was manufactured in the same way as in Example 1, except that the dye recording layer was formed using a coating liquid obtained by dissolving 1.5 g of the dye (9) in 100 mL of the solvent. Furthermore, a DVD-R type optical disk (26) for comparison was manufactured in the same way as in Example 1, except that the dye recording layer was formed using a coating liquid obtained by dissolving 1.5 g of the dye (10) in 100 mL of the solvent.

The jitter and optimum recording power of each of the DVD-R type optical disks obtained above were measured in the same way as in Example 1. The results obtained are shown in Table 7.

TABLE 7

| Dye | | Difference between the wavelengths (nm) | Sensitivity ratio Q | Mixing ratio (A:B) | Optimum recording power (mw) | Jitter (%) |
|---|---|---|---|---|---|---|
| Optical disk (22) | (9) and (10) | 4.8 | 0.43 | 4:1 | 11.8 | 11.8 |
| Optical disk (23) | (9) and (10) | 4.8 | 0.43 | 3:1 | 10.0 | 12.0 |
| Optical disk (24) | (9) and (10) | 4.8 | 0.43 | 2:1 | 9.0 | 11.0 |
| Optical disk (25) | (9) | — | — | — | 12.3 | 12.3 |
| Optical disk (26) | (10) | — | — | — | 7.0 | 13.5 |

From Table 7, it can be seen that the DVD-R type optical disks (22) to (24), whose recording layers contained two kinds of dye, each fulfilling the requirements of the present invention, could maintain recording sensitivity at a value approximately equal to the average of the recording sensitivities of the two dyes. Also, it can be seen that the jitters of the DVD-R type optical disks (22) to (24) were remarkably improved relative to the DVD-R type optical disks (25) and (26) each using a single kind of dye.

Example 4

A DVD-R type optical disk (27) according to the present invention was manufactured in the same way as in Example 1, except that the dye recording layer was formed using a coating liquid obtained by dissolving 1.2 g of the oxonol-based dye (9) and 0.3 g of the oxonol-based dye (11) in 100 mL of 2,2,3,3-tetrafluoro-1-propanol.

Further, a DVD-R type optical disk (28) for comparison was manufactured in the same way as in Example 1, except that the dye recording layer was formed using a coating liquid obtained by dissolving 1.125 g of the dye (9) and 0.375 g of the dye (11) in 100 mL of the solvent. Furthermore, a DVD-R type optical disk (29) for comparison was manufactured in the same way as in Example 1, except that the dye recording layer was formed using a coating liquid obtained by dissolving 10 g of the dye (9) and 0.5 g of the dye (11) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (9): maximum absorption wavelength:571.0 nm; maximum recording power:12.3 mW Dye (11): maximum absorption wavelength:577.4 nm; maximum recording power:6.8 mW Difference between the wavelengths of the dyes (9) and (11):7.4 nm Sensitivity ratio Q between the dyes (9) and (11):0.45

Further, a DVD-R type optical disk (30) for comparison was manufactured in the same way as in Example 1, except that the dye recording layer was formed using a coating liquid obtained by dissolving 1.5 g of the dye (9) in 100 mL of the solvent. Furthermore, a DVD-R type optical disk (31) for comparison was manufactured in the same way as in Example 1, except that the dye recording layer was formed using a coating liquid obtained by dissolving 1.5 g of the dye (11) in 100 mL of the solvent.

The jitter and optimum recording power of each of the DVD-R type optical disks obtained above were measured in the same way as in Example 1. The results obtained are shown in Table 8.

TABLE 8

| | Dye | Difference between the wavelengths (nm) | Sensitivity ratio Q | Mixing ratio (A:B) | Optimum recording power (mw) | Jitter (%) |
|---|---|---|---|---|---|---|
| Optical disk (27) | (9) and (11) | 7.4 | 0.45 | 4:1 | 10.2 | 11.0 |
| Optical disk (28) | (9) and (11) | 7.4 | 0.45 | 3:1 | 9.5 | 11.2 |
| Optical disk (29) | (9) and (11) | 7.4 | 0.45 | 2:1 | 8.7 | 11.3 |
| Optical disk (30) | (9) | — | — | — | 12.3 | 12.3 |
| Optical disk (31) | (11) | — | — | — | 6.8 | 14.7 |

From Table 8, it can be seen that the DVD-R type optical disks (27) to (29), whose recording layers contained two kinds of dye, each fulfilling the requirements of the present invention, could maintain recording sensitivity at a value approximately equal to the average of the recording sensitivities of the two dyes. Also, it can be seen that the jitters of the DVD-R type optical disks (27) to (29) were remarkably improved relative to the DVD-R type optical disks (30) and (31) each using a single kind of dye.

Example 5

A DVD-R type optical disk (32) according to the present invention was manufactured in the same way as in Example 1, except that the dye recording layer was formed using a coating liquid obtained by dissolving 1.2 g of the oxonol-based dye (12) and 0.3 g of the oxonol-based dye (13) in 100 mL of 2,2,3,3-tetrafluoro-1-propanol.

Further, a DVD-R type optical disk (33) for comparison was manufactured in the same way as in Example 1, except that the dye recording layer was formed using a coating liquid obtained by dissolving 1.125 g of the dye (12) and 0.375 g of the dye (13) in 100 mL of the solvent. Furthermore, a DVD-R type optical disk (34) for comparison was manufactured in the same way as in Example 1, except that the dye recording layer was formed using a coating liquid obtained by dissolving 10 g of the dye (12) and 0.5 g of the dye (13) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (12): maximum absorption wavelength:568.7 nm; maximum recording power:12.5 mW Dye (13): maximum absorption wavelength:575.9 nm; maximum recording power:7.2 mW Difference between the wavelengths of the dyes (12) and (13):28.2 nm Sensitivity ratio Q between the dyes (12) and (13):0.42

Further, a DVD-R type optical disk (35) for comparison was manufactured in the same way as in Example 1, except that the dye recording layer was formed using a coating liquid obtained by dissolving 1.5 g of the dye (12) in 100 mL of the solvent. Furthermore, a DVD-R type optical disk (36) for comparison was manufactured in the same way as in Example 1, except that the dye recording layer was formed using a coating liquid obtained by dissolving 1.5 g of the dye (13) in 100 mL of the solvent.

The jitter and optimum recording power of each of the DVD-R type optical disks obtained above were measured in the same way as in Example 1. The results obtained are shown in Table 9.

TABLE 9

| | Dye | Difference between the wavelengths (nm) | Sensitivity ratio Q | Mixing ratio (A:B) | Optimum recording power (mw) | Jitter (%) |
|---|---|---|---|---|---|---|
| Optical disk (32) | (12) and (13) | 28.2 | 0.42 | 4:1 | 12.0 | 11.2 |
| Optical disk (33) | (12) and (13) | 28.2 | 0.42 | 3:1 | 11.3 | 10.8 |
| Optical disk (34) | (12) and (13) | 28.2 | 0.42 | 2:1 | 10.6 | 10.9 |
| Optical disk (35) | (12) | — | — | — | 12.5 | 13.8 |
| Optical disk (36) | (13) | — | — | — | 7.2 | 14.8 |

From Table 9, it can be seen that the DVD-R type optical disks (32) to (34), whose recording layers contained two kinds of dye, each fulfilling the requirements of the present invention, could maintain recording sensitivity at a value approximately equal to the average of the recording sensitivities of the two dyes. Also, it can be seen that the jitters of the DVD-R type optical disks (32) to (34) were remarkably improved relative to the DVD-R type optical disks (35) and (36) each using a single kind of dye.

Example 6

A DVD-R type optical disk (37) according to the present invention was manufactured in the same way as in Example 1, except that the dye recording layer was formed using a coating liquid obtained by dissolving 0.75 g of the oxonol-based dye (12) and 0.75 g of the oxonol-based dye (14) in 100 mL of 2,2,3,3-tetrafluoro-1-propanol.

Further, a DVD-R type optical disk (38) for comparison was manufactured in the same way as in Example 1, except that the dye recording layer was formed using a coating liquid obtained by dissolving 1.2 g of the dye (12) and 0.3 g of the dye (14) in 100 mL of the solvent. Furthermore, a DVD-R type optical disk (39) for comparison was manufactured in the same way as in Example 1, except that the dye recording layer was formed using a coating liquid obtained by dissolving 1.4 g of the dye (12) and 0.1 g of the dye (14) in 100 mL of the solvent.

The maximum absorption wavelength of each of the dyes, the maximum recording power of each of the dyes, the difference between the wavelengths of the dyes, and the sensitivity ratio Q between the dyes were as follows.

Dye (12): maximum absorption wavelength:568.7 nm; maximum recording power:12.5 mW Dye (14): maximum absorption wavelength:577.6 nm; maximum recording power:7.0 mW Difference between the wavelengths of the dyes (12) and (14):8.9 nm Sensitivity ratio Q between the dyes (12) and (14):0.44

Further, a DVD-R type optical disk (40) for comparison was manufactured in the same way as in Example 1, except that the dye recording layer was formed using a coating liquid obtained by dissolving 1.5 g of the dye (12) in 100 mL of the solvent. Furthermore, a DVD-R type optical disk (41) for comparison was manufactured in the same way as in Example 1, except that the dye recording layer was formed using a coating liquid obtained by dissolving 1.5 g of the dye (14) in 100 mL of the solvent.

The jitter and optimum recording power of each of the DVD-R type optical disks obtained above were measured in the same way as in Example 1. The results obtained are shown in Table 10.

TABLE 10

| | Dye | Difference between the wavelengths (nm) | Sensitivity ratio Q | Mixing ratio (A:B) | Optimum recording power (mw) | Jitter (%) |
|---|---|---|---|---|---|---|
| Optical disk (37) | (12) and (14) | 8.9 | 0.44 | 1:1 | 11.5 | 12.2 |
| Optical disk (38) | (12) and (14) | 8.9 | 0.44 | 4:1 | 10.7 | 11.1 |
| Optical disk (39) | (12) and (14) | 8.9 | 0.44 | 14:1 | 9.7 | 11.0 |
| Optical disk (40) | (12) | — | — | — | 12.5 | 13.8 |
| Optical disk (41) | (14) | — | — | — | 7.0 | 15.3 |

From Table 10, it can be seen that the DVD-R type optical disks (37) to (39), whose recording layers contained two kinds of dye, each fulfilling the requirements of the present invention, could maintain recording sensitivity at a value approximately equal to the average of the recording sensitivities of the two dyes. Also, it can be seen that the jitters of the DVD-R type optical disks (37) to (39) were remarkably improved relative to the DVD-R type optical disks (40) and (41) each using a single kind of dye.

What is claimed is:

1. An optical information storage medium comprising:
   a transparent pregrooved substrate;
   a dye recording layer provided on the substrate, at which information can be recorded by irradiation with a laser; and
   a light-reflective layer provided on the dye recording layer, which is made of a metal,
   wherein the dye recording layer comprises a dye A, which has a maximum absorption wavelength in a range from 400 to 700 nm, and a dye B, which has a maximum absorption wavelength 3 to 50 nm longer than the maximum absorption wavelength of the dye A, and a sensitivity ratio Q of the dye A to the dye B, which is represented by the following equation, is from 0.20 to 0.55:

$$Q = (PA - PB)/PA$$

where PA represents an optimum recording power for the dye A and PB represents an optimum recording power for the dye B.

2. An optical information storage medium according to claim 1, wherein the dye A and the dye B are oxonol-based dyes.

3. An optical information storage medium according to claim 1, wherein the maximum absorption wavelength of the dye B is 15 to 45 nm longer than the maximum absorption wavelength of the dye A.

4. An optical information storage medium according to claim 1, wherein the maximum absorption wavelength of the dye B is 20 to 40 nm longer than the maximum absorption wavelength of the dye A.

5. An optical information storage medium according to claim 1, wherein the sensitivity ratio Q is from 0.25 to 0.50.

6. An optical information storage medium according to claim 1, wherein the sensitivity ratio Q is from 0.30 to 0.45.

7. An optical information storage medium according to claim 1, wherein a mixing ratio by weight of the dye A to the dye B is from 100:20 to 100:100.

8. An optical information storage medium according to claim 1, wherein a mixing ratio by weight of the dye A to the dye B is from 100:20 to 100:80.

9. An optical information storage medium according to claim 1, wherein a mixing ratio by weight of the dye A to the dye B is from 100:25 to 100:70.

10. An optical information storage medium comprising:
    a transparent pregrooved substrate;
    a dye recording layer provided on the substrate, at which information can be recorded by irradiation with a laser; and
    a light-reflective layer provided on the dye recording layer, which is made of a metal,
    wherein the dye recording layer comprises a dye A, which has a maximum absorption wavelength in a range from 400 to 700 nm, and a dye B, which has a maximum absorption wavelength 3 to 50 nm longer than the maximum absorption wavelength of the dye A,
    a sensitivity ratio Q of the dye A to the dye B, which is represented by the following equation, is from 0.20 to 0.55:

$$Q = (PA - PB)/PA$$

where PA represents an optimum recording power for the dye A and PB represents an optimum recording power for the dye B, and the dye A and the dye B are oxonol-based dyes represented by the following general formula (1):

General Formual (1)

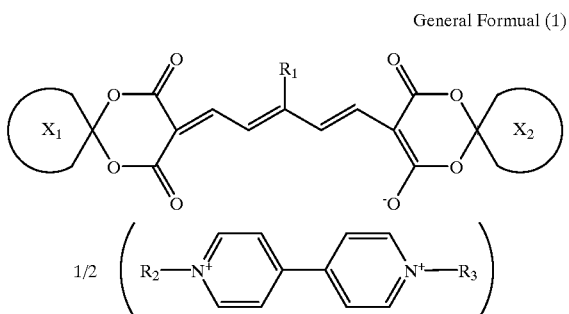

in which: $X_1$, and $X_2$ are each a carbocycle or a heterocycle; $R_1$ represents a hydrogen atom, an alkyl group, an aralkyl group, an alkoxy group, an aryl group, an aryloxy group, a heterocyclic group, a halogen atom, a carboxyl group, an alkoxycarbonyl group, a cyano group, an acyl group, a carbamoyl group, an amino group, a substituted amino group, a sulfo group, a hydroxyl group, a nitro group, a sulfonamide group, a ureido group, a sulfonyl group, a sulfinyl group, or a sulfamoyl group; and $R_2$ and $R_3$ each independently represents an alkyl group, an alkenyl group, an alkynyl group, an aralkyl group, an aryl group, or a heterocyclic group.

11. An optical information storage medium according to claim 10, wherein the maximum absorption wavelength of the dye B is 15 to 45 nm longer than the maximum absorption wavelength of the dye A.

12. An optical information storage medium according to claim 10, wherein the maximum absorption wavelength of the dye B is 20 to 40 nm longer than the maximum absorption wavelength of the dye A.

13. An optical information storage medium according to claim 10, wherein the sensitivity ratio Q is from 0.25 to 0.50.

14. An optical information storage medium according to claim 10, wherein the sensitivity ratio Q is from 0.30 to 0.45.

15. An optical information storage medium according to claim 10, wherein a mixing ratio by weight of the dye A to the dye B is from 100:20 to 100:100.

16. An optical information storage medium according to claim 10, wherein a mixing ratio by weight of the dye A to the dye B is from 100:20 to 100:80.

17. An optical information storage medium according to claim 10, wherein $R_1$ is a hydrogen atom, a methyl group, or a phenyl group.

18. An optical information storage medium according to claim 10, wherein $X_1$ and $X_2$ are each a carbocycle having from 3 to 10 carbon atoms or a heterocycle having from 2 to 10 carbon atoms.

19. An optical information storage medium according to claim 18, wherein $X_1$ and $X_2$ are the same as each other.

20. An optical information storage medium according to claim 10, wherein $X_1$ and $X_2$ are each cyclohexyl or adamantyl.

* * * * *